Patented Apr. 13, 1954

2,675,341

UNITED STATES PATENT OFFICE

2,675,341

PROTEIN HYDROLYSATE DETOXIFIED BY POLYVINYL PYRROLIDONE

Herman A. Shelanski and Abraham Cantor, Philadelphia, Pa., assignors to General Aniline & Film Corporation, New York, N. Y., a corporation of Delaware No Drawing. Application December 28, 1949, Serial No. 135,520

2 Claims. (Cl. 167—65)

This invention relates to a process of reducing the endogenous toxicity of pharmaceutical products of plant and/or animal origin and to the thus detoxified products.

The synthetic, poly N-vinylpyrrolidone of nonprotein nature and origin has been described and used as a blood plasma substitute in physiological saline solutions. This polyvinylpyrrolidone has not been considered a nutrient, and this lack of nutrient value has limited its use as a blood substitute. Certain amino acids containing, protein hydrolysates of plant or animal origin, are widely used as a parenteral fluid, and have considerable nutrient value in such use. It followed that polyvinylpyrrolidone complexes with protein hydrolysates, or with protein hydrolysate amino acid mixtures, would improve polyvinylpyrrolidone as a blood substitute. However, we discovered, most unexpectedly, that an endogenous toxicity of the protein hydroylsate rendered the protein derivative material acutely toxic, by the blood substitute evaluation method described below, and that the polyvinylpyrrolidone combination with the hydrolysate was essential, if the hydrolysate was to be administered safely.

The synthetic polymeric-N-vinyl pyrrolidone, which we have found to be useful in the process and compositions of this invention, is the product obtained by polymerizing N-vinyl-α-pyrrolidone as described in U. S. Patent 2,265,450. This product has been described and used as a blood plasma substitute in physiological saline solutions and has been available under the trade names "Periston" and "Kollidon."

In order to illustrate the blood substitute value of polyvinylpyrrolidone with pharmaceutical products of plant or animal origin, a method of simultaneous blood removal and replacement or perfusion was standardized in cats so that there was a minimum of variable shock to the animal. The total blood volume of the animal was calculated on the basis of 6% (volume/weight) of the body weight (i. e. 60 ml./kilogram). The animals were then ether anesthetized and maintained under light ether anesthesia for the duration of the procedure. The femoral vein and artery were used for the purpose of simultaneously, and at the same rates, injecting the material under test into the vein, and bleeding from the artery. In this way, the cats were bled a volume equal to their previously calculated total blood volume (6% of body weight) and simultaneously infused with the same volume of the test solution. The following test solutions were employed:

1. Physiological Ringer's lactate + 0.1% sodium bicarbonate solution.
2. Physiological Ringer's lactate + 0.1% sodium bicarbonate solution to which has been added 2.5% polyvinylpyrrolidone (K value 28).
3. Amigen (3⅓%) + 2.5% polyvinylpyrrolidone (K value 28) in—
   (a) Water; and in—
   (b) Physiological Ringer's lactate + 0.1% sodium bicarbonate solution.

It was established that, under the test condition, the physiological lactate Ringer's salt solution, solution 1 above, was inadequate as a substitute for the removal of 50% to 65% of the total blood volume, so that the animals so perfused generally failed to survive as a result of the inadequate colloidal osmotic pressure. It was then further established that the addition of 2.5% of polyvinylpyrrolidone to the same lactate Ringer's solution conferred upon the solution such blood substitute properties as to permit, by the same treatment of test animals, consistent survival of the animals.

The protein hydrolysate selected for use in these tests was a pancreatic digest of casein prepared and sold by Mead Johnson & Co. under the trade name "Amigen," which was selected since it is outstanding and widely used as a parenteral fluid. It was found, however, that solutions 3a and 3b above, prepared by the addition of a small amount (e. g. 2.5%) of polyvinylpyrrolidone to Amigen solutions, when used to perfuse cats under the identical test procedure, rendered the surviving cats pharmacologically disturbed for a few hours, after which they behaved normally. Therefore, we prepared solution 4a and 4b, to be tested without the polyvinylpyrrolidone, to determine the contribution, if any, of the Amigen alone, to the indicated objectionable reaction in the test animals.

4. Amigen (3⅓%) solution in—
   (a) Water; and in—
   (b) Physiological Ringer's lactate, 0.1% sodium bicarbonate solution.

It was then found, most unexpectedly, that when cats were treated, under the conditions specified above, with these Amigen solutions, at the same rate, there was in every case an acute toxic death within one-half to two and one-half hours from the time of the perfusion, despite the fact that the total dose of Amigen injected per kilogram of body weight was less than one-half of the daily dose recommended as safe for use in human beings.

There is no definitive explanation for the above described unexpected detoxifying action of polyvinylpyrrolidone at the present time, just as there is at present no complete understanding of the toxicity of these degraded animal or plant protein products.

While this invention has been particularly described in connection with the detoxification of the pancreatic digest of casein, sold under the trade name of Amigen, it is to be understood that other protein hydrolysates, such as protein hydrolysates derived from zein, soya beans or blood, may be used in the process and products of this invention, and in fact mixtures of amino acids and protein hydrolysates, may be used if desired, the protein hydrolysates being included since they may contain factors which are absent from mixtures of amino acids. As examples of available products of this type may be mentioned the blood hydrolysate Amino-Sol, Abbott Laboratories, and Parenamine, a casein hydrolysate, Winthrop-Stearns Co.

We claim:

1. The process of reducing the endogenous toxicity of pharmaceutical protein hydroylsate products which comprises combining with said products polyvinylpyrrolidone in pharmacologically acceptable concentrations, whereby the toxicity of said protein hydrolysate is substantially reduced.

2. A novel composition of matter comprising a mixture of a pharmaceutical protein hydrolysate product and an effective amount of polyvinyl pyrrolidone whereby said mixture being characterized by substantially lower toxicity than that characteristic of the protein hydrolysate.

References Cited in the file of this patent

UNITED STATES PATENTS

| Number | Name | Date |
|---|---|---|
| 2,411,897 | Sahyun | Dec. 3, 1946 |
| 2,474,729 | Durel et al. | June 28, 1949 |

OTHER REFERENCES

Lehmann: Schweizerische Apotheker, Zeitung, November 22, 1947, pages 949 to 950.

Manufacturing Chemist and Mfg. Perfumer, September, 1948, XIX, 9, pages 414 to 415.